United States Patent [19]
Pickett et al.

[11] Patent Number: 4,567,100
[45] Date of Patent: Jan. 28, 1986

[54] FORCED ENTRY AND BALLISTIC RESISTANT LAMINAR STRUCTURE

[75] Inventors: Teddy L. Pickett; Gary R. Cook, both of Ventura, Calif.

[73] Assignee: The United States of America as represented by the Secretary of the Navy, Washington, D.C.

[21] Appl. No.: 525,340

[22] Filed: Aug. 22, 1983

[51] Int. Cl.[4] .................................................. E04B 2/02
[52] U.S. Cl. .................................... 428/339; 428/412;
428/416; 428/464; 428/911; 52/309.13;
52/309.14; 52/309.15; 52/811; 109/82
[58] Field of Search ........... 52/309.13, 309.14, 309.15,
52/811; 428/911, 464, 412, 416, 332, 339;
109/82

[56] References Cited
U.S. PATENT DOCUMENTS

| | | | |
|---|---|---|---|
| 701,922 | 6/1902 | Nelson | 109/84 |
| 1,440,484 | 1/1923 | Mooney | 109/47 |
| 1,548,441 | 8/1925 | Branovich | 109/84 |
| 2,399,184 | 4/1946 | Heckert | 428/911 |
| 3,962,976 | 6/1976 | Kelsey | 109/82 |
| 4,198,454 | 4/1980 | Norton | 428/117 |
| 4,470,357 | 9/1984 | Sanzaro | 109/82 |

*Primary Examiner*—Richard Bueker
*Attorney, Agent, or Firm*—Robert F. Beers; Joseph M. St-Amand

[57] ABSTRACT

A laminar system for constructing doors and window shutters, to harden the inside of walls and to greatly increase the penetration resistance of structures. The sketch illustrates the material system and gives representative material thicknesses. The laminar system comprises an outer steel sheet, hardwood, polycarbonate plastic, a ballistic resistant (hardened steel) sheet, and an inner sheet of steel; the materials are laminated in the order given from the outside (attack side) to the inside. This laminar materials systems (used as a 3 foot wide by 7 foot high door, for example) provides greater penetration and ballistic resistance with lighter weight than prior systems.

12 Claims, 1 Drawing Figure

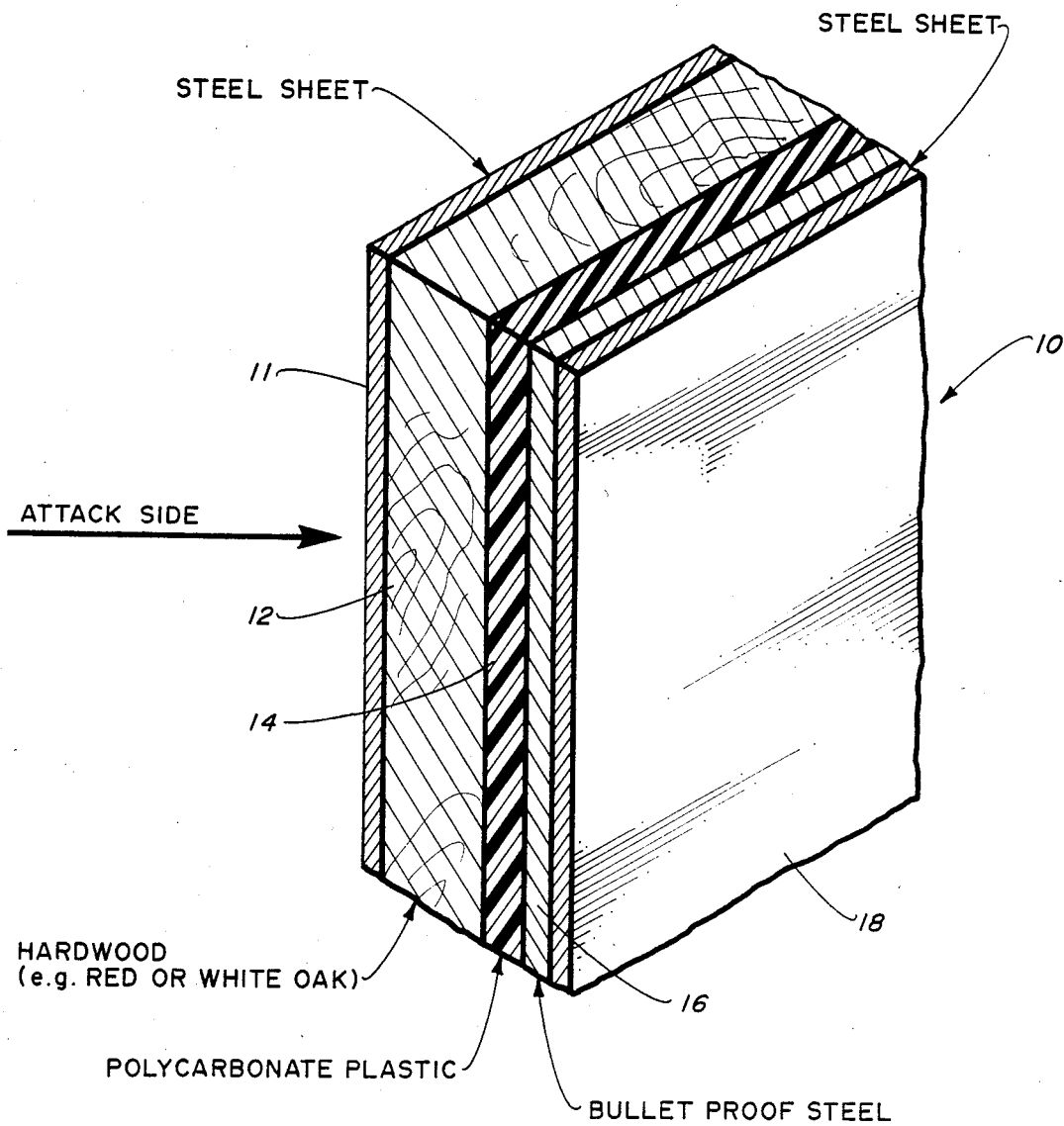

FORCED ENTRY AND BALLISTIC RESISTANT LAMINAR STRUCTURE

BACKGROUND OF THE INVENTION

This invention relates generally to laminated panels, and in particular for providing a penetration and ballistic resistant laminar composite structure resistant to forced entry from a variety of attack tools as well as resistant to penetration by ballistic and explosive forces.

Secure structures usually use personnel doors that are constructed from wood, hollow metal, or metal-clad wood. Windows frequently are protected with jail-bar type grills or bullet-proof plastic, and walls may be made of wood, brick, concrete block, or concrete. Most of these construction options, particularly the doors and windows, can be defeated in less than one minute using common hand and power tools.

Various forms of composite penetration resistant structure have been known; however, there is a need for lighter weight barriers to protect and secure commercial and military structures, particularly for doors, windows and walls. Prior composite panel structures have been relatively heavy, and the need for a lighter weight material system is apparent.

SUMMARY OF THE INVENTION

This invention is intended to allow construction of buildings that are much more secure than present conventional constructions. Determined criminals can break into most buildings in less than one minute through the doors, windows, or even the walls. The laminar system of the present invention makes it possible to construct doors and window shutters, and harden the inside of walls in a reasonably economical manner to greatly increase the penetration resistance of structures.

A laminar penetration resistant structure comprising an outer steel sheet, hardwood, polycarbonate plastic, a thin layer of armor (i.e. hardened) steel and an inner steel sheet are bonded together in that order into a composite panel. The laminated structure provides a greater resistance to penetration than available from thicker and/or heavier prior structures.

BRIEF DESCRIPTION OF THE DRAWING

The FIGURE of drawing shows a cross-sectional perspective view of a typical penetration resistant panel structure.

DESCRIPTION OF THE PREFERRED EMBODIMENT

The FIGURE of drawing illustrates the material system of the laminar structure of this invention, and gives representative material thicknesses for a typical door structure, for example. The laminar system 10 consists of a steel sheet 11, a hardwood layer 12 of red or white oak, a polycarbonate plastic layer 14, a sheet of bullet-proof (hardened) steel 16, and a sheet of steel 18. The layers are listed in order from the outside (attack side to the inside for proper and efficient operation, and are laminated together with a suitable adhesive, such as a structural epoxy adhesive (gray), for example. Steel sheet 18 is not required for strength but is used to provide a smooth inside surface to the structure and when extended around the edges of the panel assists in the overall assembly of the laminar structure. Steel sheet 18 can be omitted, if desired, where it serves no useful purpose.

The thicknesses for a typical panel are shown in the cross-sectional FIGURE of drawing, by way of representation, for a door, etc., to a secured structure. For example, the outside steel sheet 11 is 11 gauge; the hardwood 12 is 1½ inches thick, the polycarbonate plastic layer 14 (i.e., a bullet resistant grade, either clear or opaque) is ½ inch thick, the hardened steel sheet 16 (armor plate/double air-hardened steel) is 3/16 inch thick (which is relatively thin in comparison to most armor plate used for security purposes), and the inside steel sheet 18 thickness is 11 gauge. The inner or outer steel sheets 11 and 18 are typically medium-carbon cold-rolled steel, and, if desired, can be larger and bent around the edges to form a steel edge around the door, or steel channel can be used. A typical door panel structure, as shown in the FIGURE of drawing, with laminar thicknesses as given above, provides:

Ballistic resistance to 7.62 mm NATO Ball ammunition fired from an M-14 rifle at 25 yards range, 0-degree obliquity (25 rounds in 6 inch diameter circle).

Resists power tools attack in excess of 17 minutes to make an 8 inch by 12 inch (96 sq. in.) man passable opening.

Thermal resistance (e.g., against oxy-acetylene torches) in excess of 16 minutes to make an 8 inch by 12 inch (96 sq. in.) man passable opening.

This material system laminated in the forgoing sequence provides more than a ten fold increase in the penetration resistance of doors and windows (when used as shutters on the inside of windows), and by adding this laminar materials system to the inside of buildings provides an easy way to make the walls more secure. Furthermore, this laminar materials system (used as a 3 foot wide by 7 foot high door weighing around 500 pounds for example) provides ballistic resistance equal to conventional ballistic resistant doors weighing almost 900 pounds thereby substantially reducing the weight. For a stronger door, such as for use with high explosive magazines and perhaps up to 11 inches thick, for example, proportionally thicker layers can be used; however, in most instances the hardened steel sheet 16 need not be any thicker than 3/16 inch.

Armor steel 16 surfaced with polycarbonate plastic 14 provides high ballistic resistance and is less costly and lighter in weight than merely using a denser armor plate. The use of oak hardwood, polycarbonate plastic and hardened steel provide an economical resistance to thermal cutting equipment and ballistic penetration. It is extremely difficult to cut wood, polycarbonate plastic and steel with the same equipment and usually requires several types of equipment to do so, thus providing additional delays in an attempt to penetrate the laminar structure. Polycarbonate plastic is comparable to oak in fire resistance and provides high ballistic resistance while being less dense and less costly than armor plate. The combination of materials in the order, as shown and listed, provides greater penetration and ballistic resistance with less costly and less bulky and lighter weight laminar structures. The use of rubber, asbestos, loose filler materials, and soft metals as used in prior type panels provide little resistance to cutting tools.

The various layers of materials are laminated together in the specific order listed, as previously mentioned, from the outside to the inside, and operate as follows: Steel sheet 11 causes a bullet to commence to "mushroom" when it strikes, and hardwood layer 12 further slows down and continues to cause the bullet to mushroom; the polycarbonate plastic layer 14, being high ballistic resistant, absorbs much of the remaining bullet impact force at that point, and the armor steel sheet 16 finally stops the bullet. In addition, this specific order of layers in the laminate panel also operates more efficiently against thermal penetration. The outer steel sheet, being relatively thin in comparison to the hardwood layer 12, operates to contribute a minimum of fuel for thermal cutting devices which use iron in steel to contribute as a fuel for their operation, and the relatively thick hardwood layer offers increased delay to thermal penetration. The specific sequence of material layers have been found to provide a more efficient barrier to ballistic and thermal attack using less material and have a greater than ten fold resistance to penetration over conventional ballistic resistant wall structures.

If ballistic resistance is not required the polycarbonate plastic can be eliminated and the thickness of wood increased. Other species of hardwoods can be used, but red and white oak are the most penetration resistant species commonly available in the United States. Optionally, the wood may be chemically treated to reduce flamability and further delay thermal attack tools. Thicknesses of the various materials can be changed to increase or decrease penetration/ballistic resistance. The dimensions given above, by way of example, are probably the ones that would be used for the most common applications.

Obviously many modifications and variation of the present invention are possible in light of the above teachings. It is therefore to be understood that within the scope of the appended claims the invention may be practiced otherwise than as specifically described.

What is claimed is:

1. A composite laminar panel structure capable of resisting penetration from attack by cutting tools, heat, small arms, projectiles and explosive forces, consisting in order of sequence from an attack side to the back side of the panel structure:
   a. a first relatively thin metal sheet which faces the direction of attack;
   b. a relatively thick layer of penetration and flame resistant hardwood disposed behind and adhered to said first metal sheet; said hardwood layer being chemically treated to reduce flamability thereof and delay thermal attack tools;
   c. a high ballistic resistant and flame resistant plastic sheet disposed and adhered to said panel of hardwood;
   d. a second metal sheet consisting of a relatively thin layer of armor plate metal disposed behind and adhered to said high ballistic plastic layer; said sequence of materials laminated in said specific order from the attack side of the panel structure providing a laminar wall system having higher penetration resistance over comparable thickness and weight prior ballistic resistant wall structures.

2. A composite laminar panel structure as in claim 1, wherein: said various laminar layers are connected together with a structural epoxy adhesive.

3. A composite laminar panel structure as in claim 1, wherein: said layer of hardwood is oak.

4. A composite laminar panel structure as in claim 1, wherein: said bullet resistant plastic is polycarbonate plastic.

5. A composite laminar panel structure as in claim 1, wherein: said armor plate metal is double air-hardened steel.

6. A composite laminar panel structure as in claim 1, wherein: a third metal sheet is adhered to said second metal sheet at the back side of said laminar panel structure.

7. A composite laminar panel structure as in claim 1, wherein: said first metal sheet is medium-carbon cold-rolled steel.

8. A composite laminar panel structure as in claim 1, wherein: said third metal sheet is 11 gauge steel.

9. A composite laminar panel structure as in claim 1, wherein: said first metal sheet is 11 gauge steel, said layer of hardwood is approximately 1½ inches in thickness, said bullet resistant plastic layer is ½ inch thick polycarbonate plastic, said armor plate metal is approximately 3/16 inch thick double air-hardened steel.

10. A composite laminar panel structure capable of resisting penetration from attack by cutting tools, heat, small arms, projectiles, and explosive forces, consisting in order of sequence from an attack side to the back side of the panel structure:
    a. a first layer of 11 gauge steel sheet metal which faces the direction of attack;
    b. a second layer of penetration and flame resistant hardwood of approximately 1.5 inches thickness disposed behind and adhered to said first metal sheet; said hardwood layer being chemically treated to reduce flamability thereof and delay thermal attack tools;
    c. a high ballistic resistant and flame resistant polycarbonate plastic third layer of approximately 0.5 inch thickness disposed behind and adhered to said hardwood layer;
    d. a fourth layer consisting of a second metal sheet of armor plate steel of approximately 3/16 inch thickness disposed behind and adhered to the back of said high ballistic resistant and flame resistant plastic layer;
    e. said various laminar layers being laminated together with a structural epoxy adhesive; said sequence of material layers in specific order from the attack side to the back side of the panel structure providing a laminar wall system having higher penetration resistance over comparable thickness and weight prior ballistic resistant wall structures.

11. A composite laminar panel structure as in claim 10, wherein: said hardwood is oak.

12. A composite laminar panel as in claim 10, wherein: said armor plate metal is double air-hardened steel.

* * * * *